United States Patent
Hazen et al.

(10) Patent No.: US 11,328,457 B2
(45) Date of Patent: May 10, 2022

(54) SYSTEM AND METHOD FOR TINTING OF COMPUTER-GENERATED OBJECT(S)

(71) Applicant: Microsoft Technology Licensing, LLC, Redmond, WA (US)

(72) Inventors: Lisa Michelle Hazen, Everett, WA (US); Dylan Michael Piepenbrok, Seattle, WA (US); Sarah Lynn Kisor, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/676,555

(22) Filed: Nov. 7, 2019

(65) Prior Publication Data
US 2021/0074032 A1    Mar. 11, 2021

Related U.S. Application Data (60) Provisional application No. 62/898,852, filed on Sep. 11, 2019.

(51) Int. Cl.
*G06T 11/00* (2006.01)
*G06T 5/20* (2006.01)
*G06T 5/00* (2006.01)
*G06T 11/40* (2006.01)

(52) U.S. Cl.
CPC ............ *G06T 11/001* (2013.01); *G06T 5/009* (2013.01); *G06T 5/20* (2013.01); *G06T 11/40* (2013.01)

(58) Field of Classification Search
None
See application file for complete search history.

(56) References Cited

U.S. PATENT DOCUMENTS

| | | | |
|---|---|---|---|
| 6,809,838 B1 * | 10/2004 | Gilman | H04N 1/6097 358/1.9 |
| 8,406,519 B1 * | 3/2013 | Lim | G06T 11/00 382/170 |
| 8,855,432 B2 | 10/2014 | Cheong et al. | |

(Continued)

FOREIGN PATENT DOCUMENTS

CN    107205142 A    9/2017

OTHER PUBLICATIONS

"Colour Overlay while Maintaining Shadows/Highlights", Retrieved from: https://graphicdesign.stackexchange.com/questions/110123/colour-overlay-while-maintaining-shadows-highlights/110129, Jun. 2, 2018, 13 Pages.

(Continued)

*Primary Examiner* — Aaron M Richer
(74) *Attorney, Agent, or Firm* — Rainier Patents, P.S.

(57) ABSTRACT

Described herein is a system and method for tinting of a computer-generated object. Selection of a target color to be applied to be an object is received. The target color can have a luminosity component and a chroma component (e.g., the luminosity, hue, chroma (LHC) color space). Based, at least in part, upon at least one of the luminosity component or the chroma component of the target color, one or more tinting methods of a plurality of tinting methods is selected to tint the object to the target color. The object can be tinted using the selected one or more tinting methods, and, the tinted object provided (e.g., stored and/or displayed to a user via a graphical user interface).

20 Claims, 8 Drawing Sheets

(56) References Cited

U.S. PATENT DOCUMENTS

| | | | |
|---|---|---|---|
| 8,896,706 | B2 | 11/2014 | van den Hengel et al. |
| 9,159,144 | B2 | 10/2015 | Cherna et al. |
| 9,390,538 | B2 | 7/2016 | Goldberg et al. |
| 10,860,838 | B1* | 12/2020 | Elahie ............... G06K 9/00315 |
| 2004/0161147 | A1* | 8/2004 | Takahashi ............ H04N 1/6008 |
| | | | 382/167 |
| 2006/0087518 | A1 | 4/2006 | Ameline et al. |
| 2006/0192788 | A1 | 8/2006 | Stollnitz |
| 2006/0227149 | A1 | 10/2006 | Cain |
| 2008/0055478 | A1 | 3/2008 | Jaspers |
| 2009/0060326 | A1 | 3/2009 | Imai et al. |
| 2009/0295822 | A1* | 12/2009 | Okada ................. G06T 11/001 |
| | | | 345/589 |
| 2010/0149181 | A1 | 6/2010 | Lee et al. |
| 2011/0285735 | A1 | 11/2011 | Bolz et al. |
| 2012/0154426 | A1 | 6/2012 | Darsa et al. |
| 2016/0063749 | A1* | 3/2016 | Howell ............... G01N 23/203 |
| | | | 250/310 |
| 2016/0086316 | A1* | 3/2016 | Lee ..................... H04N 9/643 |
| | | | 382/167 |
| 2017/0262970 | A1* | 9/2017 | Chen ................. G06K 9/00302 |
| 2018/0277056 | A1* | 9/2018 | Atrawalkar ........... G06T 11/001 |

OTHER PUBLICATIONS

"Application as Filed in U.S. Appl. No. 16/516,182", filed Jul. 18, 2019, 117 Pages.

Bala, et al., "Spatial Color-to-Grayscale Transform Preserving Chrominance Edge Information", In Proceedings of the Twelfth Color Imaging Conference: Color Science and Engineering Systems, Technologies, Applications, Nov. 9, 2004, 5 Pages.

Short, Michael, "Optimising our shadows in Unity", Retrieved from: https://medium.com/spaceapetech/optimising-our-shadows-in-unity-c26e691d9d0b, Sep. 25, 2018, 10 Pages.

Bunks, Carey, "Grokking The Gimp—Chapter 5.8 and 5.8.1: Practical Uses of Blending Modes and Colorization", Retrieved From: https://www.linuxtopia.org/online_books/graphics_tools/gimp_advanced_guide/gimp_guide_node57.html, Jan. 1, 2000, 4 Pages.

"International Search Report & Written Opinion issued in PCT Application No. PCT/US20/038287", dated Sep. 15, 2020, 14 Pages.

Smith, Alvy R. , "Tint Fill", In Proceedings of the 6th Annual Conference on Computer Graphics and Interactive Techniques, Aug. 1, 1979, pp. 276-283.

* cited by examiner

SYSTEM AND METHOD FOR TINTING OF COMPUTER-GENERATED OBJECT(S)

RELATED APPLICATION

This application claims priority to U.S. Provisional Application No. 62/898,852, filed Sep. 11, 2019, entitled "A System and Method for Tinting of Computer-Generated Object(s)", the disclosure of which is hereby incorporated by reference herein in its entirety.

BACKGROUND

Artists can create computer-generated object(s) such as character(s) for video game(s). Using a graphical user interface (GUI), user(s) can customize the object(s), for example, by selecting a target base color for the object. The object can be tinted based upon the selected target base color. However, conventional tinting methods have resulted in perceptual alteration of features such as highlights and shadows of the object.

SUMMARY

Described herein is a system for tinting of a computer-generated object, comprising: a computer comprising a processor and a memory having computer-executable instructions stored thereupon which, when executed by the processor, cause the computer to: receive selection of a target color to be applied to be the object, the target color having a luminosity component and a chroma component; based, at least in part, upon at least one of the luminosity component or the chroma component of the target color, select one or more tinting methods of a plurality of tinting methods to tint the object to the target color; tint the object using the selected one or more tinting methods; and provide the tinted object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various technologies pertaining to tinting of computer-generated object(s) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding tinting of computer-generated object(s). What follows are one or more exemplary systems and methods.

Aspects of the subject disclosure pertain to the technical problem of tinting of computer-generated object(s). The technical features associated with addressing this problem involve receiving selection of a target color to be applied to be the object, the target color having a luminosity component and a chroma component; based, at least in part, upon at least one of the luminosity component or the chroma component of the target color, selecting one or more tinting methods of a plurality of tinting methods to tint the object to the target color; tinting the object using the selected one or more tinting methods; and providing the tinted object. Accordingly, aspects of these technical features exhibit technical effects of more efficiently and effectively tinting of computer-generated object(s), for example, reducing computer resource consumption and/or bandwidth.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Artists can create computer-generated object(s) such as character(s) for video game(s). Using a graphical user interface (GUI), user(s) can customize the object(s), for example, by selecting a target base color for the object. The object can be tinted based upon the selected target base color. However, conventional tinting methods have resulted in perceptual alteration of features such as highlights and shadows of the object.

Described herein is a system and method for tinting of computer-generated object(s). A computer-generated object can be selected by a user along with a target color to tint the selected object. The target color can have a luminosity component and a chroma component (e.g., in the luminosity, hue, chroma (LHC) color space). Based, at least in part, upon the luminosity component and/or the chroma component of the target color, one or more tinting methods can be selected to tint the object to the target color. The selected tinting method(s) can be used to tint the object to the target object. The tinted object can then be stored (e.g., for use by the user in a video game environment).

Figure 1:
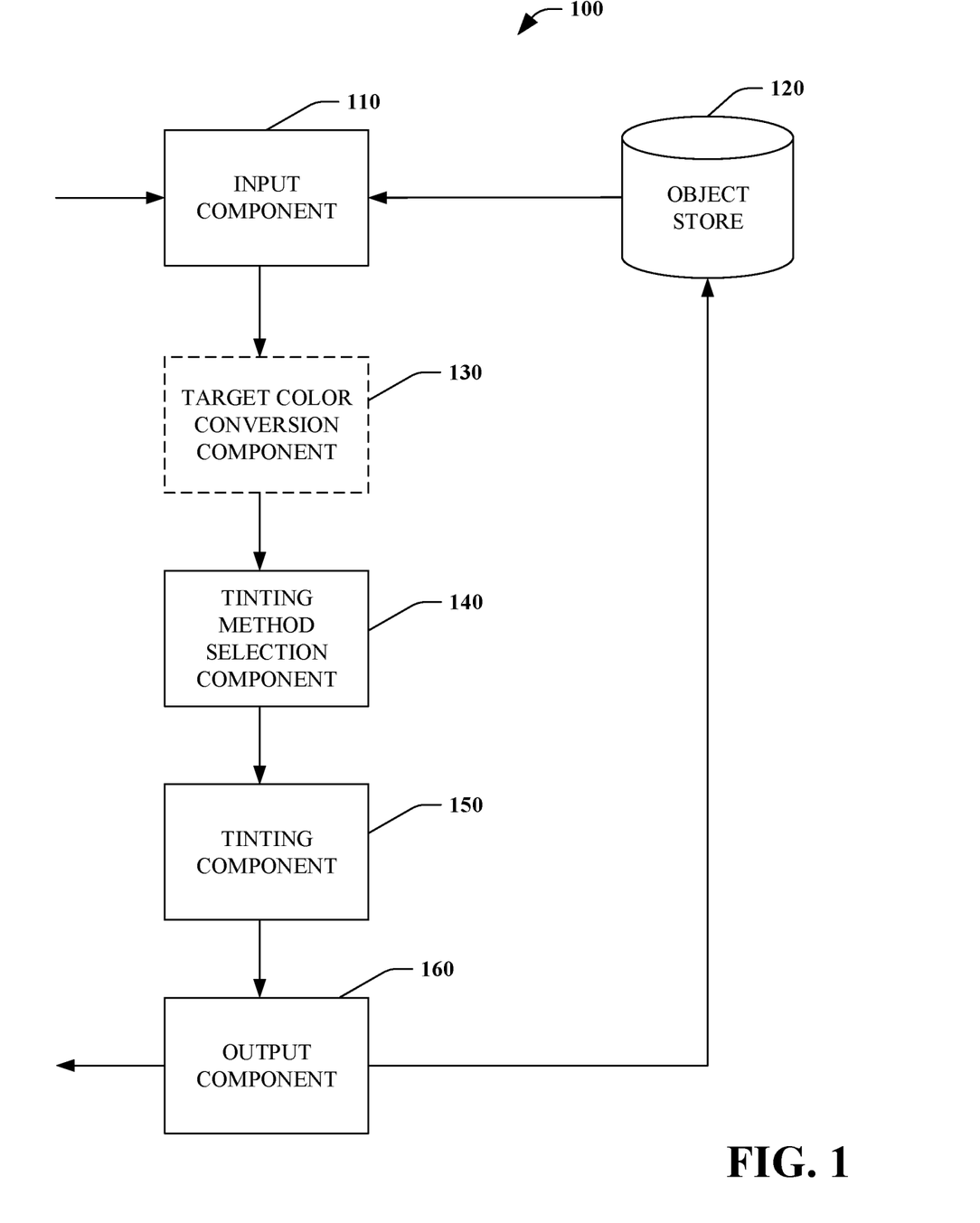
FIG. 1 is a functional block diagram that illustrates a system for tinting of a computer-generated object.

Referring to FIG. 1, a system for tinting of a computer-generated object 100 is illustrated. In some embodiments, the system 100 allows an artist to paint textures for a computer-generated object (e.g., character), including highlights and/or shadows that can be shifted to a different hue to create variation in the final color of the object (e.g., character). A consistent shift can maintain the original object's variation in characteristic(s) (e.g., value and/or saturation).

The system 100 includes an input component 110 that receives selection of a target color to be applied to a computer-generated object. In some embodiments, the input component 110 further receives selection of a particular computer-generated object from a plurality of computer-generated objects, for example, stored in an object store 120.

In some embodiments, target color is stored in a color space having a luminosity component and a chroma component, for example, the luminosity, hue, chroma (LHC) color space. In some embodiments, the target color is stored in the red, green, blue (RGB) color space. An optional target color conversation component 130 can convert the target color to a color space having a luminosity component and a chroma component.

A tinting method selection component 140 can select one or more tinting methods of a plurality of tinting methods to tint the object to the target color. Selection can be, at least in part, upon the luminosity component and/or the chroma component of the target color. By selecting tinting methods based upon luminosity and/or chroma, a color shift to the selected target color can be non-destructive to shadow(s) and/or highlight(s) thus maintaining the visual richness of form originally created (e.g., painted by the artist). A tinting component 150 can tint the object using the selected one or more tinting methods.

In some embodiments, the tinting method selection component 140 can be employed for character skin tone(s) of a computer-generated character (e.g., the object). In some embodiments, the tinting method selection component 140 can be utilized for other applications, such as clothing and/or accessories.

In some embodiments, a particular tinting method is selected based solely upon a luminosity component of the target color. For example, a first tinting method is selected for a luminosity value less than a luminosity threshold, and, a second tinting method is selected for a luminosity value greater than or equal to the luminosity threshold.

In some embodiments, a particular tinting method is selected based solely upon a chroma component of the target color. For example, a first tinting method is selected for a chroma value less than a chroma threshold, and, a second tinting method is selected for a chroma value greater than or equal to the chroma threshold.

Figure 2:
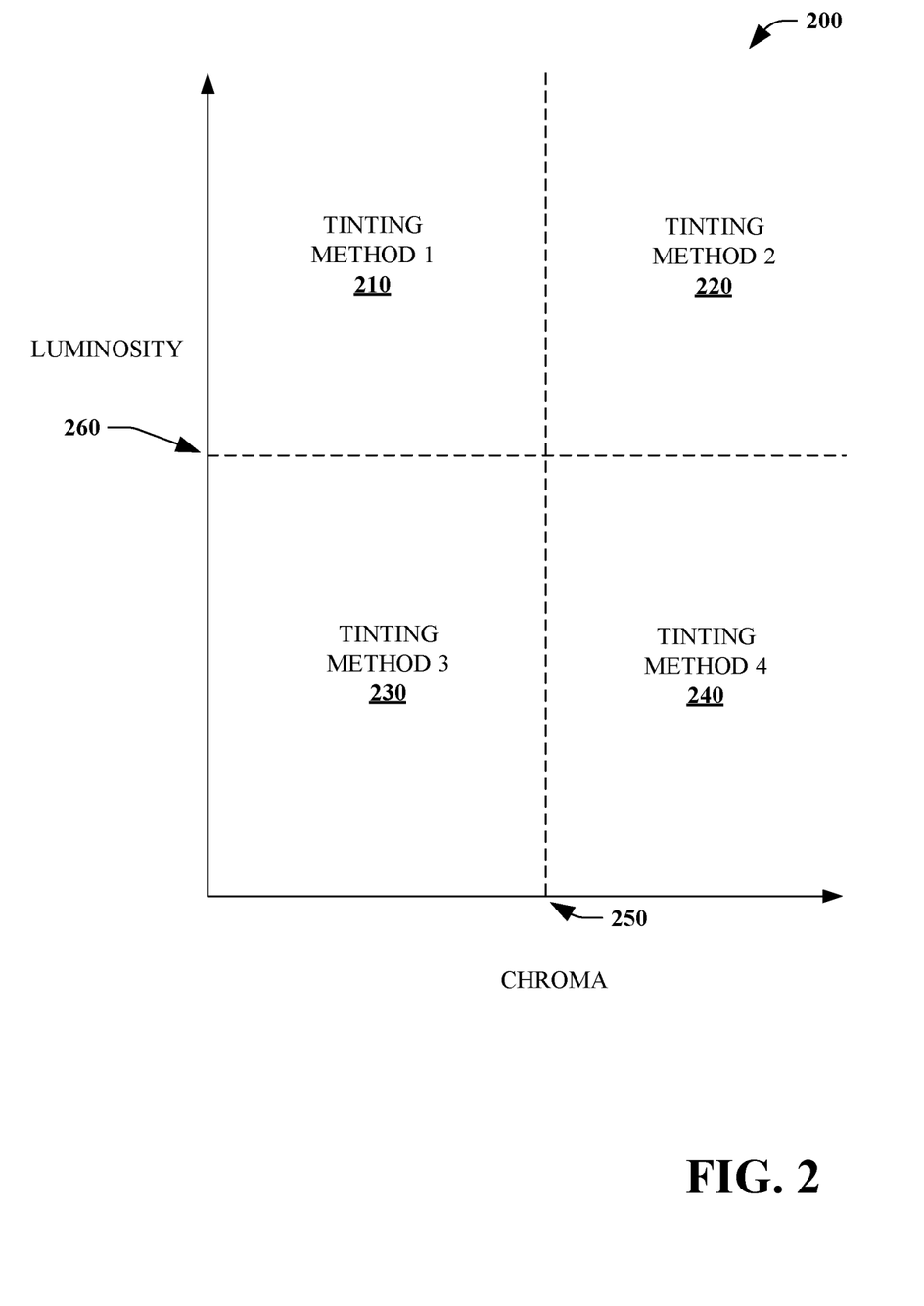
FIG. 2 is a graph that illustrates selection of a tinting method.

In some embodiments, a particular tinting method is selected based upon a chroma component and a luminosity component of the target color. Referring to FIG. 2, a graph 200 illustrating selection of a tinting method is illustrated. Selection of one of four tinting methods 210, 220, 230, 240 is performed based upon a chroma value and a luminosity value of a target color relative to a chroma threshold 250 and a luminosity threshold 260.

Figure 3:
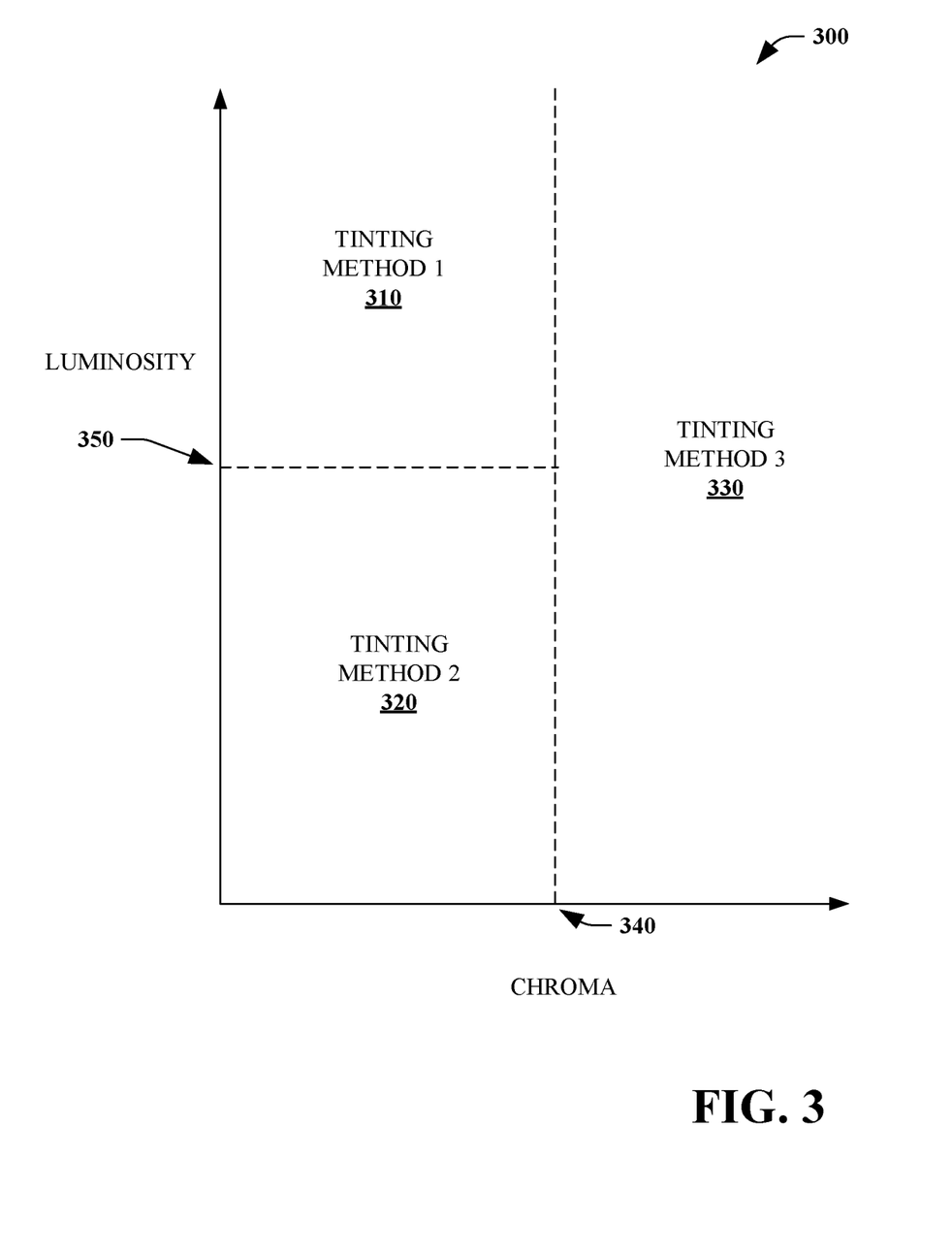
FIG. 3 is a graph that illustrates selection of a tinting method.

Turning to FIG. 3, a graph 300 illustrating selection of a tinting method is illustrated. Selection of one of three tinting methods 310, 320, 330 is performed based upon a chroma value and/or a luminosity value of a target color relative to a chroma threshold 340 and a luminosity threshold 350. In some embodiments, the first tinting method 310 is linear burn, the second tinting method 320 is LHC offset, and the third tinting method 330 is value overlay.

In some embodiments, more than one tinting method can be selected by the tinting method selection component 140 based, at least in part, upon the luminosity component and/or the chroma component of the target color. For example, filter region(s) can be defined about the chroma threshold and/or a luminosity threshold (e.g., symmetrical, asymmetrical, linear, non-linear). For chroma value(s) and/or luminosity value(s) that fall within the filter region(s), a plurality of selected tinting methods (e.g., two, three, four) can be utilized by the tinting component 150 with output values of the selected tinting methods combined to tint the object.

In some embodiments, the tinting component 150 applies a filter to chroma value(s) and/or luminosity value(s) that fall within the filter region(s). In some embodiments, the filter is linear. In some embodiments, the filter is non-linear (e.g., S-shaped)

Figure 4:
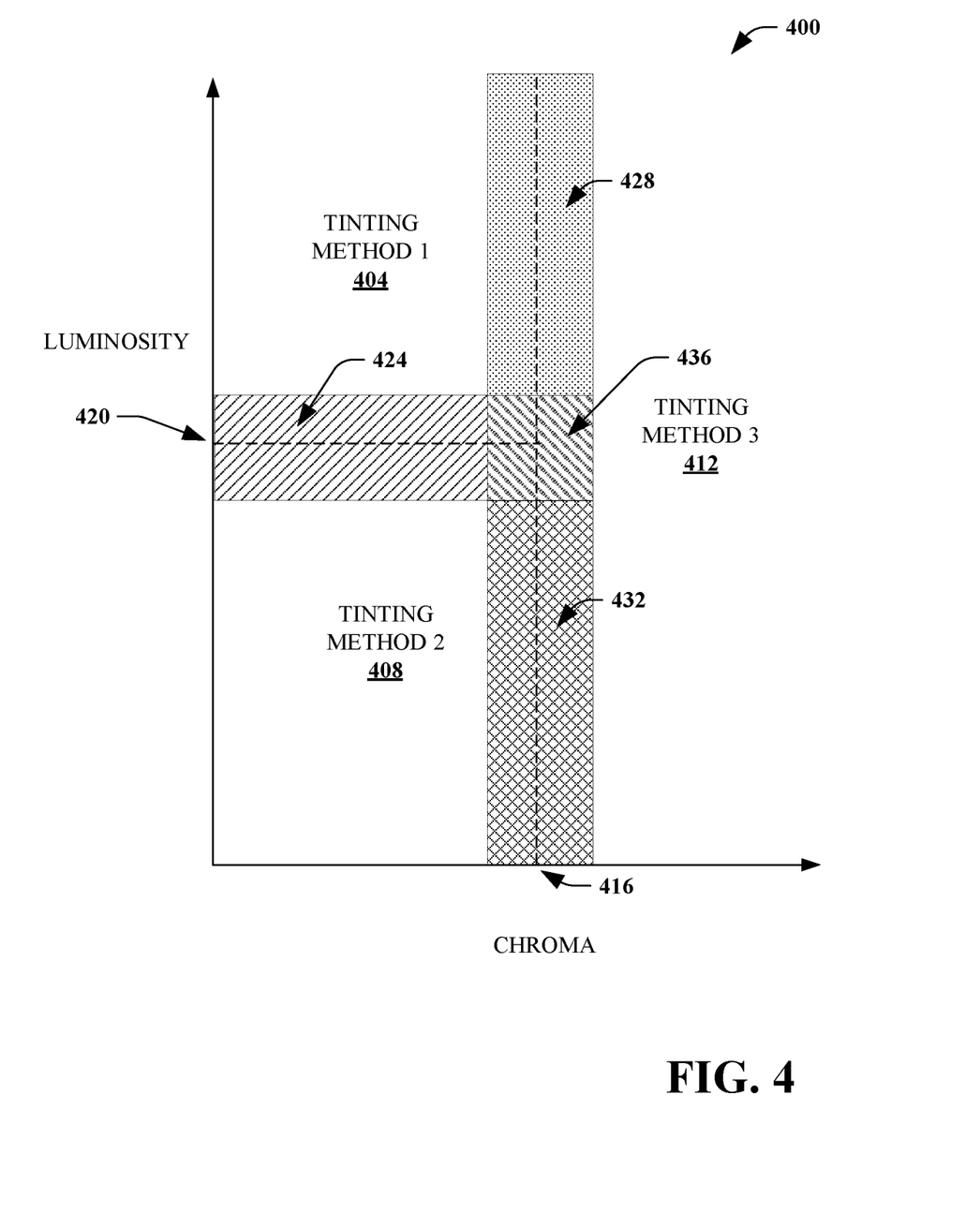
FIG. 4 is a graph that illustrates selection of a tinting method.

Referring to FIG. 4, a graph 400 illustrating selection of tinting method(s) is illustrated. Selection of one or more of three tinting methods 404, 408, 412 is performed based upon a chroma value and/or a luminosity value of a target color relative to a chroma threshold 416, and a luminosity threshold 420. For purposes of explanation and not limitation, four filter regions 424, 428, 432, 436 are provided.

For target colors having a chroma value less than the chroma threshold 416, and a luminosity value that falls within the first filter region 424, both first tinting method 404 and the second tinting method 408 are used with values from both methods 404, 408 combined (filtered) to arrive a final tinting values for the object.

For target colors having a chroma value and luminosity value falling within the second filter region 428, both first tinting method 404 and the third tinting method 412 are used with values from both methods 404, 412 combined (filtered) to arrive a final tinting values for the object. For target colors having a chroma value and luminosity value falling within the third filter region 432, both second tinting method 408 and the third tinting method 412 are used with values from both methods 408, 412 combined (filtered) to arrive a final tinting values for the object. Finally, for target colors having a chroma value and luminosity value falling within the fourth filter region 432, the first tinting method 404. The second tinting method 408, and the third tinting method 412 are used with values from the three methods 404, 408, 412 combined (filtered) to arrive at final tinting values for the object.

For purposes of explanation, and not limitation, tinting methods utilized by the tinting method selection component 140 and/or the tinting component 150 can include value overlay, linear burn, LHC offset, color overlay, color multiply, value multiply, and/or hue, saturation, lightness (HSL) offset.

Color multiply can involve an original texture painted in grayscale with another color multiplied over it to achieve a desired visual result. However, these methods produce highlights and/or shadows that are not varied in saturation or tone and can look 'dirty' or 'grimy' in final appearance. These methods also fail to perform consistently across hues as a particular method can perform well with warm colors but fail with cool ones. By including pre-defined tinting methods, pre-defined chroma threshold(s), and pre-defined luminosity threshold(s), the system 100 can overcome these problems by utilizing a particular tinting method for particular chroma and/or luminosity values for which the particular tinting method is well-suited.

An output component 160 can provide the tinted object. In some embodiments, the tinted object can be displayed to the user via a graphical user interface. In some embodiments, the tinted object can be stored, for example, in the object store 120.

Figure 5:
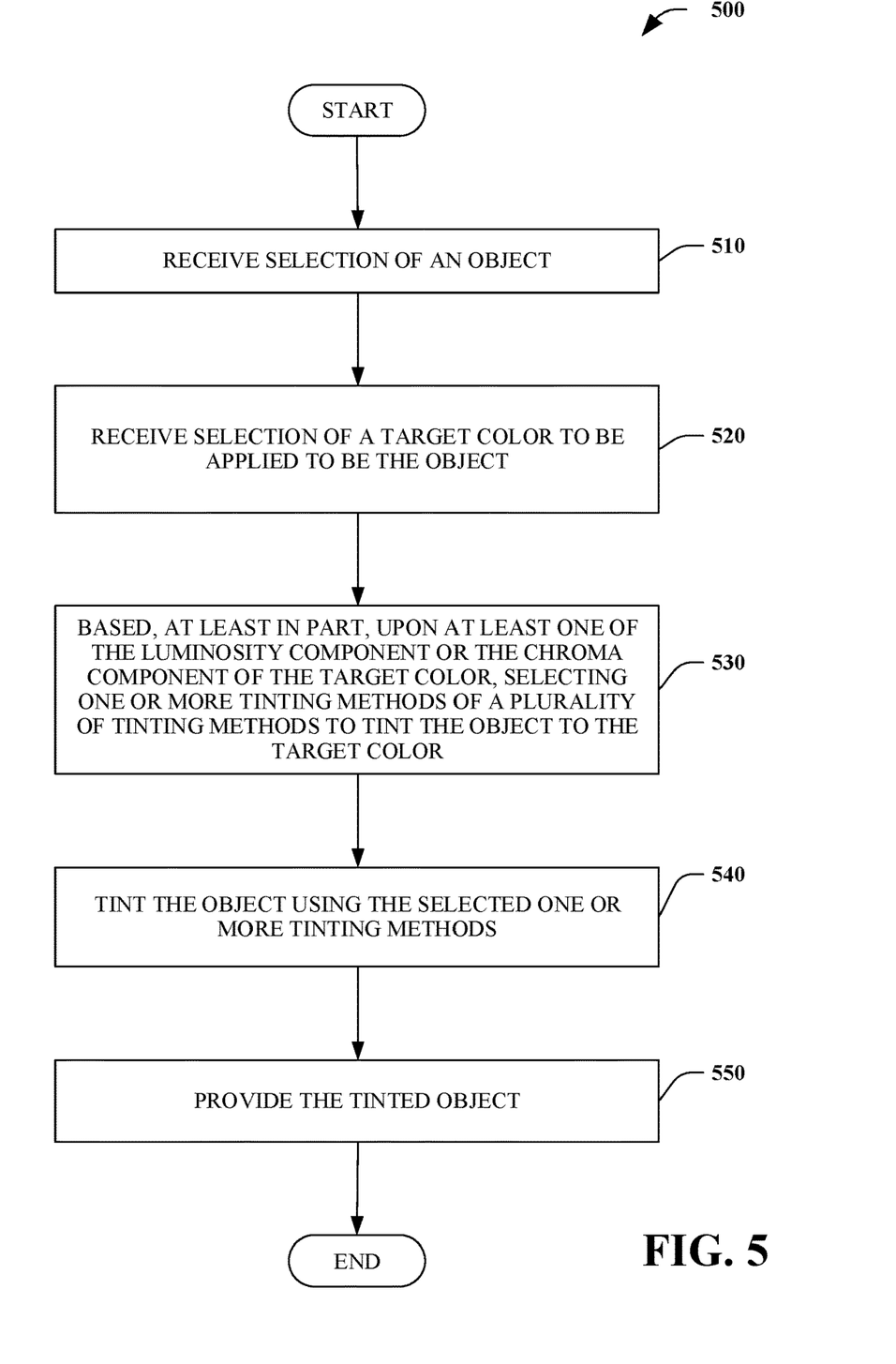
FIG. 5 is a flow chart that illustrates a method for tinting of computer-generated object(s).
Figure 6:
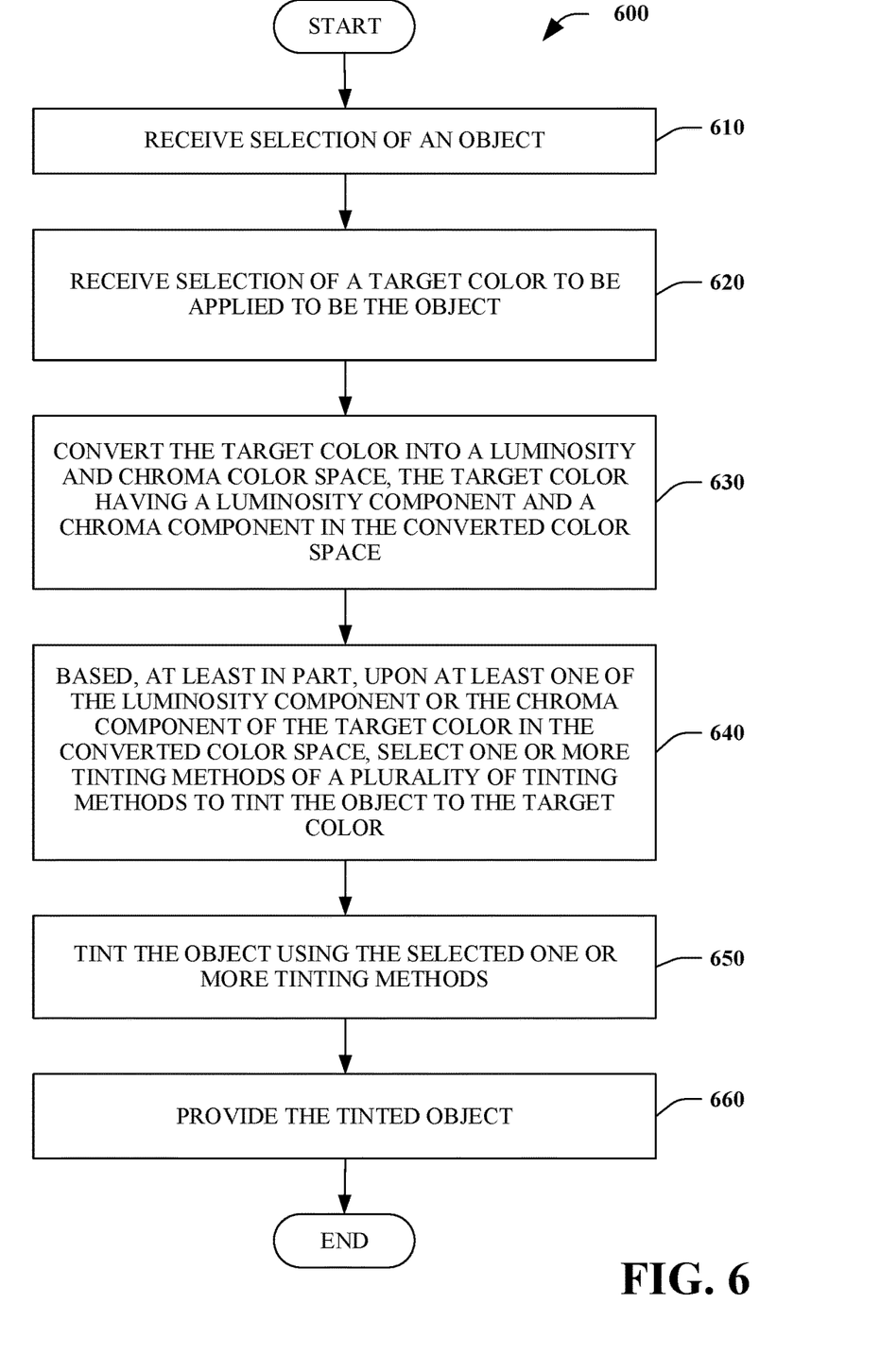
FIG. 6 is a flow chart that illustrates another method for tinting of computer-generated object(s).
Figure 7:
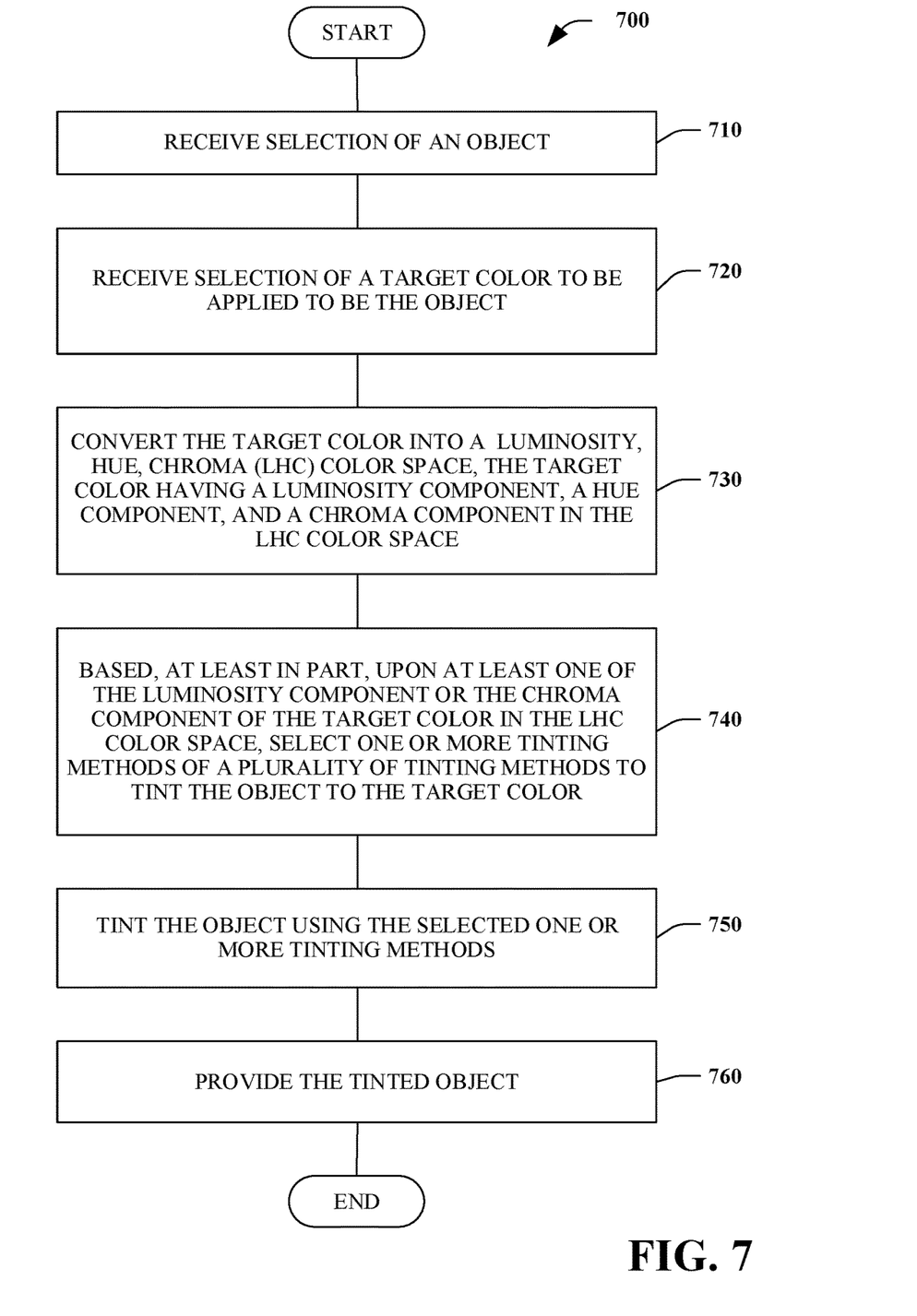
FIG. 7 is a flow chart that illustrates yet another method for tinting of computer-generated object(s).

FIGS. 5-7 illustrate exemplary methodologies relating to tinting of computer-generated object(s). While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 5, a method for tinting of computer-generated object(s) 500 is illustrated. In some embodiments, the method 500 is performed by the system 100.

At 510, selection of an object is received. At 520, selection of a target color to be applied to be the object is received. The target color comprises a luminosity component and a chroma component.

At 530, based, at least in part, upon at least one of the luminosity component or the chroma component of the target color, one or more tinting methods of a plurality of tinting methods is selected to tint the object to the target color. At 540, the object is tinted using the selected one or more tinting methods. At 550, the tinted object is provided (e.g., to a user and/or stored).

Turning to FIG. 6, a method for tinting of computer-generated object(s) 600 is illustrated. In some embodiments, the method 600 is performed by the system 100.

At 610, selection of an object is received. At 620, selection of a target color to be applied to be the object is received. At 630, the target color is converted into a luminosity and chroma color space. The target color has a luminosity component and a chroma component in the converted color space.

At 640, based, at least in part, upon at least one of the luminosity component or the chroma component of the target color in the converted color space, one or more tinting methods of a plurality of tinting methods is selected to tint the object to the target color. At 650, the object is tinted using the selected one or more tinting methods. At 660, the tinted object is provided.

Turning next to FIG. 7, a method for tinting of computer-generated object(s) 700 is illustrated. In some embodiments, the method 700 is performed by the system 100.

At 710, selection of an object is received. At 720, selection of a target color to be applied to be the object is received. At 730, the target color is converted into a luminosity, hue, chroma (LHC) color space. The target color has a luminosity component, a hue component, and a chroma component in the LHC color space.

At 740, based, at least in part, upon at least one of the luminosity component or the chroma component of the target color in the LHC color space, one or more tinting methods of a plurality of tinting methods is selected to tint the object to the target color. At 750, the object is tinted using the selected one or more tinting methods. At 760, the tinted object is provided.

Described herein is a system for tinting of a computer-generated object, comprising: a computer comprising a processor and a memory having computer-executable instructions stored thereupon which, when executed by the processor, cause the computer to: receive selection of a target color to be applied to be the object, the target color having a luminosity component and a chroma component; based, at least in part, upon at least one of the luminosity component or the chroma component of the target color, select one or more tinting methods of a plurality of tinting methods to tint the object to the target color; tint the object using the selected one or more tinting methods; and provide the tinted object.

The system can further include wherein a plurality of tinting methods is selected to tint the object to the target color. The system can further include wherein the object comprises a computer-generated character and tinting of the object is employed for skin tone of the computer-generated character. The system can further include wherein selection of the one or more tinting methods is based, at least in part, upon the luminosity component and the chroma component of the target color.

The system can further include wherein the plurality of tinting methods comprises at least one of a value overlay, a linear burn, a luminosity, hue, chroma (LHC) offset, a color overlay, a color multiply, a value multiply, or a hue, saturation, lightness (HSL) offset. The system can further include wherein tint the object further comprises applying a filter to at least of the chroma component or the luminosity component. The system can further include wherein selection of the target color to be applied to be the object is received via a graphical user interface.

Described herein is a method for tinting of a computer-generated object, comprising: receiving selection of a target color to be applied to be an object; converting the target color into a luminosity and chroma color space, the target color having a luminosity component and a chroma component in the converted color space; based, at least in part, upon at least one of the luminosity component or the chroma component of the target color in the converted color space, selecting one or more tinting methods of a plurality of tinting methods to tint the object to the target color; tinting the object using the selected one or more tinting methods; and providing the tinted object.

The method can further include wherein a plurality of tinting methods is selected tint the object to the target color. The method can further include wherein the object comprises a computer-generated character and tinting of the object is employed for skin tone of the computer-generated character. The method can further include wherein selection of the one or more tinting methods is based, at least in part, upon the luminosity component and the chroma component of the target color.

The method can further include wherein the plurality of tinting methods comprises at least one of a value overlay, a linear burn, a luminosity, hue, chroma (LHC) offset, a color overlay, a color multiply, a value multiply, or a hue, saturation, lightness (HSL) offset. The method can further include wherein tint the object further comprises applying a filter to at least of the chroma component or the luminosity component. The method can further include wherein selection of the target color to be applied to be the object is received via a graphical user interface.

Described herein is a computer storage medium storing computer-readable instructions that when executed cause a computing device to: receive selection of a target color to be applied to be an object; convert the target color into a luminosity, hue, chroma (LHC) color space, the target color having a luminosity component, a hue component, and a chroma component in the LHC color space; based, at least in part, upon at least one of the luminosity component or the chroma component of the target color in the LHC color space, select one or more tinting methods of a plurality of tinting methods to tint the object to the target color; tint the object using the selected one or more tinting methods; and provide the tinted object.

The computer storage medium can further include wherein a plurality of tinting methods is selected tint the object to the target color. The computer storage medium can further include wherein the object comprises a computer-generated character and tinting of the object is employed for skin tone of the computer-generated character.

The computer storage medium can further include wherein selection of the one or more tinting methods is based, at least in part, upon the luminosity component and the chroma component of the target color. The computer storage medium can further include wherein the plurality of tinting methods comprises at least one of a value overlay, a linear burn, a luminosity, hue, chroma (LHC) offset, a color overlay, a color multiply, a value multiply, or a hue, saturation, lightness (HSL) offset. The computer storage medium can further include wherein tint the object further comprises applying a filter to at least of the chroma component or the luminosity component.

Figure 8:
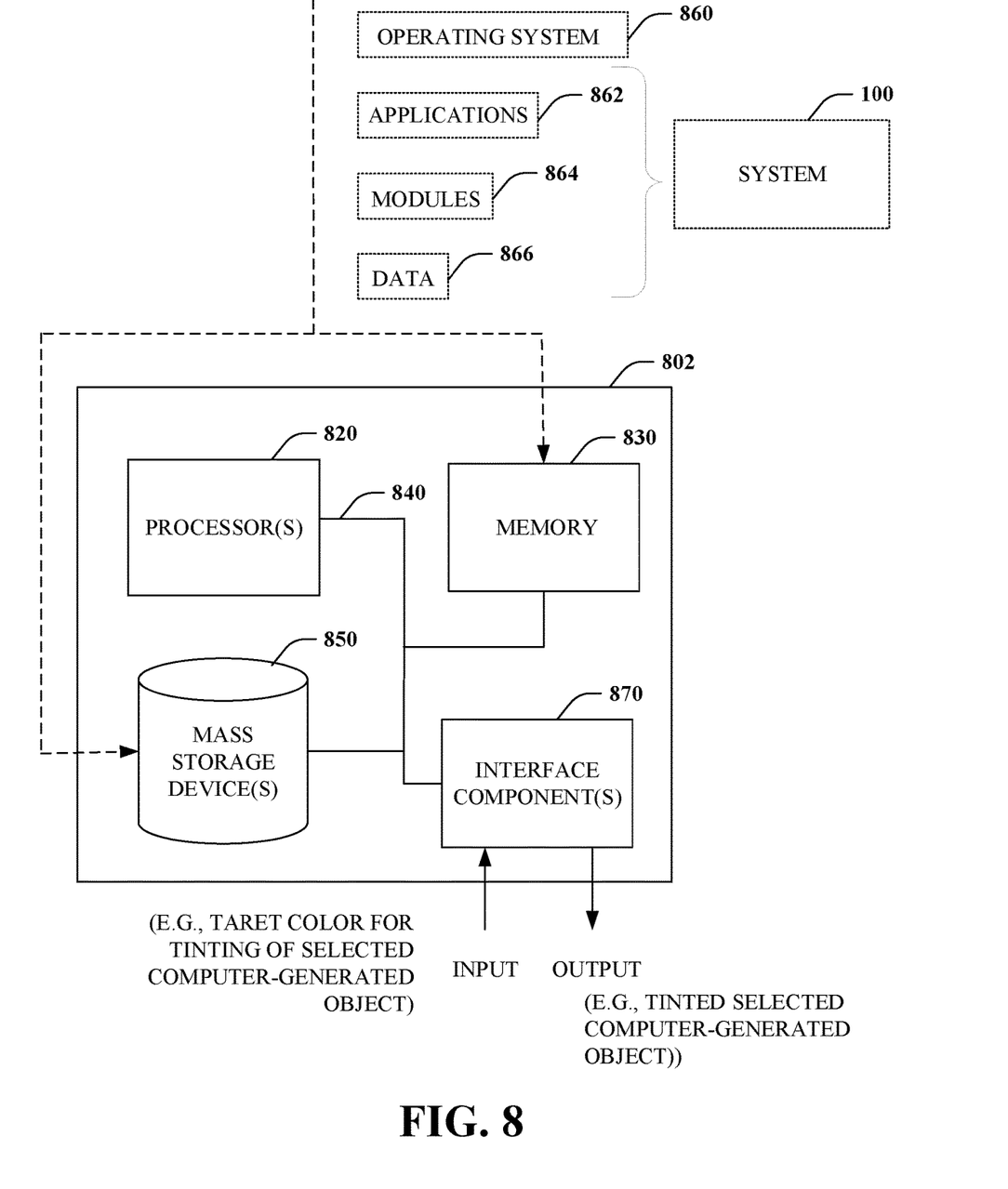
FIG. 8 is a functional block diagram that illustrates an exemplary computing system.

With reference to FIG. 8, illustrated is an example general-purpose computer or computing device 802 (e.g., mobile phone, desktop, laptop, tablet, watch, server, handheld, programmable consumer or industrial electronics, set-top box, game system, compute node, etc.). For instance, the computing device 802 may be used in a system for tinting of a computer-generated object 100.

The computer 802 includes one or more processor(s) 820, memory 830, system bus 840, mass storage device(s) 850, and one or more interface components 870. The system bus 840 communicatively couples at least the above system constituents. However, it is to be appreciated that in its simplest form the computer 802 can include one or more processors 820 coupled to memory 830 that execute various computer executable actions, instructions, and or components stored in memory 830. The instructions may be, for instance, instructions for implementing functionality described as being carried out by one or more components discussed above or instructions for implementing one or more of the methods described above.

The processor(s) 820 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 820 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 820 can be a graphics processor.

The computer 802 can include or otherwise interact with a variety of computer-readable media to facilitate control of the computer 802 to implement one or more aspects of the claimed subject matter. The computer-readable media can be any available media that can be accessed by the computer 802 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 802. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 830 and mass storage device(s) 850 are examples of computer-readable storage media. Depending on the exact configuration and type of computing device, memory 830 may be volatile (e.g., RAM), non-volatile (e.g., ROM, flash memory, etc.) or some combination of the two. By way of example, the basic input/output system (BIOS), including basic routines to transfer information between elements within the computer 802, such as during start-up, can be stored in nonvolatile memory, while volatile memory can act as external cache memory to facilitate processing by the processor(s) 820, among other things.

Mass storage device(s) 850 includes removable/non-removable, volatile/non-volatile computer storage media for storage of large amounts of data relative to the memory 830. For example, mass storage device(s) 850 includes, but is not limited to, one or more devices such as a magnetic or optical disk drive, floppy disk drive, flash memory, solid-state drive, or memory stick.

Memory 830 and mass storage device(s) 850 can include, or have stored therein, operating system 860, one or more applications 862, one or more program modules 864, and data 866. The operating system 860 acts to control and allocate resources of the computer 802. Applications 862 include one or both of system and application software and can exploit management of resources by the operating system 860 through program modules 864 and data 866 stored in memory 830 and/or mass storage device (s) 850 to perform one or more actions. Accordingly, applications 862 can turn a general-purpose computer 802 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 862, and include one or more modules 864 and data 866 stored in memory and/or mass storage device(s) 850 whose functionality can be realized when executed by one or more processor(s) 820.

In some embodiments, the processor(s) 820 can correspond to a system on a chip (SOC) or like architecture including, or in other words integrating, both hardware and software on a single integrated circuit substrate. Here, the processor(s) 820 can include one or more processors as well as memory at least similar to processor(s) 820 and memory 830, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 802 also includes one or more interface components 870 that are communicatively coupled to the system bus 840 and facilitate interaction with the computer 802. By way of example, the interface component 870 can be a port (e.g. serial, parallel, PCMCIA, USB, FireWire, etc.) or an interface card (e.g., sound, video, etc.) or the like. In one example implementation, the interface component 870 can be embodied as a user input/output interface to enable a user to enter commands and information into the computer 802, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 870 can be embodied as an output peripheral interface to supply output to displays (e.g., LCD, LED, plasma, etc.), speakers, printers, and/or other computers, among other things. Still further yet, the interface component 870 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
   a processor; and
   a memory having computer-executable instructions stored thereupon which,
      when executed by the processor, cause the system to:
      store an object having an original texture including an original color, the original texture including perceivable variations in highlights and shadows, the original color including an original hue component;
      receive a selection of one target color for the object from a user, the target color having a target hue component, a target luminosity component, and a target chroma component;
      select one tinting method for the object from a plurality of candidate tinting methods based on a comparison of the target luminosity component with a luminosity threshold and a comparison of the target chroma component with a chroma threshold;
      tint the object from the original color to the target color using the selected tinting method by changing the original hue component to the target hue component by a consistent hue offset throughout the original texture to generate a target texture that includes the perceivable variations in highlights and shadows; and
      provide the tinted object having the target texture.

2. The system of claim 1, wherein two or more of the plurality of candidate tinting methods are selected to tint the object to the target color.

3. The system of claim 1, wherein the plurality of candidate tinting methods comprise at least one of a value overlay, a linear burn, a luminosity, hue, chroma (LHC) offset, a color overlay, a color multiply, a value multiply, or a hue, saturation, lightness (HSL) offset.

4. The system of claim 1, wherein tinting the object further comprises applying a filter to at least one of the target chroma component or the target luminosity component.

5. The system of claim 1, wherein selection of the target color to be applied to the object is received via a graphical user interface.

6. The system of claim 1, wherein selecting the one tinting method comprises:
   selecting a first tinting method upon determining that the target luminosity component is greater than the luminosity threshold and the target chroma component is less than the chroma threshold;
   selecting a second tinting method upon determining that the target luminosity component is greater than the luminosity threshold and the target chroma component is greater than the chroma threshold;
   selecting a third tinting method upon determining that the target luminosity component is less than the luminosity threshold and the target chroma component is less than the chroma threshold; and
   selecting a fourth tinting method upon determining that the target luminosity component is less than the luminosity threshold and the target chroma component is greater than the chroma threshold.

7. A method, comprising:
storing an object having an original texture including an original color, the original texture including perceivable variations in highlights and shadows, the original color including an original hue component;
receiving a selection of one target color for the object;
converting the target color into a color space, the target color having a target hue component, a target luminosity component, and a target chroma component in the color space;
selecting one tinting method for the object from a plurality of candidate tinting methods based on a comparison of the target luminosity component with a luminosity threshold and a comparison of the target chroma component with a chroma threshold;
tinting the object from the original color to the target color using the selected tinting method by changing the original hue component to the target hue component by a consistent hue offset throughout the original texture to generate a target texture that includes the perceivable variations in highlights and shadows; and
providing the tinted object having the target texture.

8. The method of claim 7, wherein two or more of the plurality of candidate tinting methods are selected to tint the object to the target color.

9. The method of claim 7, wherein the object comprises a computer-generated video game character and the original texture comprises skin tone of the computer-generated video game character.

10. The method of claim 7, wherein the plurality of candidate tinting methods comprise at least one of a value overlay, a linear burn, a luminosity, hue, chroma (LHC) offset, a color overlay, a color multiply, a value multiply, or a hue, saturation, lightness (HSL) offset.

11. The method of claim 7, wherein tinting the object further comprises applying a filter to at least of the target chroma component or the target luminosity component.

12. The method of claim 7, wherein selection of the target color to be applied to the object is received via a graphical user interface.

13. The method of claim 7, wherein selecting the one tinting method comprises:
selecting a first tinting method upon determining that the target luminosity component is greater than the luminosity threshold and the target chroma component is less than the chroma threshold;
selecting a second tinting method upon determining that the target luminosity component is less than the luminosity threshold and the target chroma component is less than the chroma threshold; and
selecting a third tinting method upon determining that the target chroma component is greater than the chroma threshold.

14. The method of claim 7, wherein selecting the one tinting method comprises:
selecting a first tinting method upon determining that the target luminosity component is greater than the luminosity threshold and the target chroma component is less than the chroma threshold;
selecting a second tinting method upon determining that the target luminosity component is greater than the luminosity threshold and the target chroma component is greater than the chroma threshold;
selecting a third tinting method upon determining that the target luminosity component is less than the luminosity threshold and the target chroma component is less than the chroma threshold; and
selecting a fourth tinting method upon determining that the target luminosity component is less than the luminosity threshold and the target chroma component is greater than the chroma threshold.

15. A computer storage medium storing computer-readable instructions that, when executed, cause a computing device to:
store an object having an original texture including an original color, the original texture including perceivable variations in highlights and shadows, the original color including an original hue component;
receive a selection of one target color for the object;
convert the target color into a luminosity, hue, chroma (LHC) color space, the target color having a target luminosity component, a target hue component, and a target chroma component in the LHC color space;
select one tinting method for the object from a plurality of candidate tinting methods based on a comparison of the target luminosity component with a luminosity threshold and a comparison of the target chroma component with a chroma threshold;
tint the object from the original color to the target color using the selected tinting method by changing the original hue component to the target hue component by a consistent hue offset throughout the original texture to generate a target texture that includes the perceivable variations in highlights and shadows; and
provide the tinted object having the target texture.

16. The computer storage medium of claim 15, wherein two or more of the plurality of candidate tinting methods are selected to tint the object to the target color.

17. The computer storage medium of claim 15, wherein the object comprises a computer-generated video game character and the original texture comprises skin tone of the computer-generated video game character.

18. The computer storage medium of claim 15, wherein the plurality of candidate tinting methods comprise at least one of a value overlay, a linear burn, a luminosity, hue, chroma (LHC) offset, a color overlay, a color multiply, a value multiply, or a hue, saturation, lightness (HSL) offset.

19. The computer storage medium of claim 15, wherein tinting the object further comprises applying a filter to at least one of the target chroma component or the target luminosity component.

20. The computer storage medium of claim 15, wherein selection of the one tinting method comprises:
selecting a first tinting method upon determining that the target luminosity component is greater than the luminosity threshold and the target chroma component is less than the chroma threshold;
selecting a second tinting method upon determining that the target luminosity component is greater than the luminosity threshold and the target chroma component is greater than the chroma threshold;
selecting a third tinting method upon determining that the target luminosity component is less than the luminosity threshold and the target chroma component is less than the chroma threshold; and
selecting a fourth tinting method upon determining that the target luminosity component is less than the luminosity threshold and the target chroma component is greater than the chroma threshold.

\* \* \* \* \*